Figure 1:
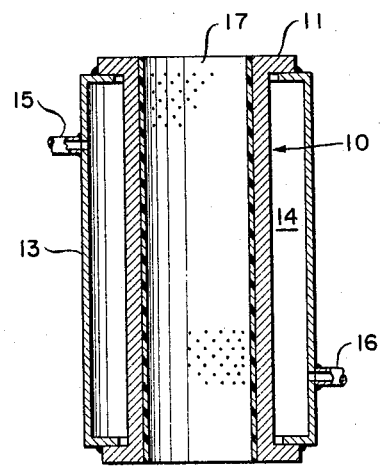

United States Patent Office 3,279,889
Patented Oct. 18, 1966

3,279,889
PROTECTING PLASTIC LINERS AGAINST BLISTERING
Peter Rychly, Bad Soden, Taunus, Germany, assignor to Shell Oil Company, New York, N.Y., a corporation of Delaware
Filed Dec. 3, 1964, Ser. No. 415,718
Claims priority, application Germany, Dec. 4, 1963, E 26,005
3 Claims. (Cl. 23—252)

This invention relates to protecting a plastic liner in a conduit against blistering. More particularly, the invention is directed to apparatus comprising a conduit having a perforated plastic film or liner adhesively bonded to the inner wall thereof. The invention has specific application in connection with vessels used in the decomposition of paraffin-urea adducts, e.g., as produced in the urea dewaxing process.

The term conduit is herein used generically to include reactor vessels, heating coils, pipes and the like.

The carrying out of many chemical and technical processes involves passing liquid phases through a reaction conduit in which solid materials are formed from the liquid phases. Complications frequently arise in such processes because the solid materials being formed adhere to the walls of the reaction conduit, stirring mechanisms and other parts of the apparatus. The formation of these solid deposits greatly reduces the cross-sectional area or diameter of the reaction conduit and can lead to total blocking of the reaction conduit.

It is known that the aforementioned solid deposition can be inhibited by coating or lining the reaction conduits or parts thereof with materials which distinguish themselves by their non-adhesive properties. Polyethylene and polytetrafluoroethylene are typical examples of such materials.

However, in many chemical processes the use of such non-adhesive liners has been prevented due to a phenomenon which will now be described. Certain solvents, present in the liquid phase, tend to diffuse into both the plastic liner and the adhesive used to glue said liner to the reaction conduit. This diffusion is particularly pronounced where a polytetrafluoroethylene (such as that marketed under the trade designation of Teflon) liner is glued to a reaction conduit in which the formation or decomposition of adducts of straight-chain hydrocarbons and urea occurs. Upon heating of the reaction conduit the solvents, which have diffused into the liner, suddenly expand at a rapid rate into the vapor state. The vapor or gas cannot pass or diffuse back through the film rapidly enough and as a result the film blisters and is lifted or peeled off the supporting structure. This blister formation is even more evident where there is frequent temperature change, such as caused by the inflow of steam, etc.

The above-described blister formation may be completely eliminated by lining the reaction conduit with a finely perforated plastic film. Thus, when the reaction conduit is heated to the evaporation temperature of the solvent (which is diffused within the plastic film) the rapidly expanding solvent passes through the perforations and thereby prevents the aforementioned blistering effect.

Figure 2:
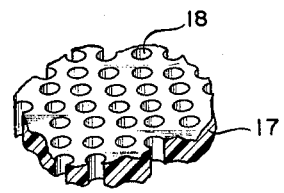

The invention will now be described with reference to the accompanying drawings wherein:

FIGURE 1 is a longitudinal section of an apparatus equipped with a perforated plastic film liner according to the invention; and, FIGURE 2 is an enlarged isometric view of a small section of the perforated plastic liner.

Referring to FIGURE 1 a reaction conduit is shown generally at 10. The conduit 10 is preferably constructed of metal or other suitable material capable of withstanding high temperatures and is provided with outwardly projecting annular flange portions 11 on each end. A heat exchange device 13 is suitably attached, as by welding, to the flange portions 11 and defines a heating chamber 14 which completely surrounds the conduit 10. An inlet pipe 15 and outlet pipe 16 serve as supply and discharge means, respectively, for a suitable heating fluid as will be readily understood. It should be noted that the apparatus shown is for purposes of illustration only and the conduit 10 could be shaped as a coil, etc., surrounded by any known means of heat exchange device.

A thin plastic film or liner 17 is fixedly secured to the inner wall of the conduit 10 by a suitable heat resistant adhesive material (not shown). The plastic film or liner 17 is preferably constructed of polyethylene or a fluorocarbon polymer, such as polytetrafluoroethylene, although in this aspect the invention includes the use of any plastic material which has the requisite non-adhesive property with regard to the solids which are formed as liquid passes through the reaction conduit 10.

As best shown in FIGURE 2 the entire surface of the plastic film 17 is provided with many extremely small perforations 18 which are placed very close to each other. In this manner the plastic film 17 serves effectively as a non-adhering liner with respect to the solids being formed in the conduit 10 and also functions as a gas "sieve" which prevents blistering and rupturing of the liner when liquids which have gradually diffused into the liner are suddenly vaporized.

To further illustrate the advantages of the invention, the following example is given. It is to be understood, however, that the examples is for the purpose of illustration and the invention is not to be regarded as limited to any of the specific materials or conditions recited therein.

*Example*

A cylindrical metal container having a diameter of 1600 mm. and a height of 1800 mm. was lined with polytetrafluoroethylene films (i.e., Teflon) having a thickness of 0.2 mm. Sixty percent (60%) of the interior area of the container was covered with a smooth imperforate film. The remaining forty percent (40%) was covered with film which had 1 mm. perforations spaced 10 mm. from each other in both the horizontal and vertical directions.

This container was then subjected to normal operating conditions for several months in which temperature changes were avoided. Under these conditions there was no blister formation in either of the two types of lining.

Steam was then conducted to the container for ten (10) minutes as is normally done in vapor treatment of reactors. Numerous blisters with a diameter of up to 200 mm. had formed under the smooth (imperforate) film, whereas the perforated film liner exhibited no property changes whatsoever. After additional heating of the container lasting up to 45 minutes, the perforated film remained unchanged.

I claim:
1. Apparatus comprising:
   a conduit adapted to carry organic fluid;
   a plastic film adhesively engaged to the inner wall of said conduit, said plastic film being of a composition that is permeable to the organic fluid carried by said conduit and having a plurality of closely spaced fine perforations distributed throughout the surface thereof, said perforations providing rapid exhaust means for diffused fluid trapped between said conduit and said film; and
   heating means surrounding at least a portion of said conduit.

2. Apparatus as set forth in claim 1 wherein said film is a polytetrafluoroethylene film.

3. A method of operating a reaction vessel to prevent deposition of a reaction product on the inner wall of said vessel, said method comprising the steps of:

providing heating means surrounding a portion of said vessel;

securing a plastic liner to the inner wall of said vessel opposite said heating means, said plastic liner being permeable to a liquid within said vessel; and providing perforations through the liner to permit rapid escape of fluid trapped between said liner and said vessel.

References Cited by the Examiner

UNITED STATES PATENTS

| 2,374,511 | 4/1945 | Upham | 23—888.3 X |
| 3,050,786 | 8/1962 | St. John et al. | 138—143 X |
| 3,098,444 | 7/1963 | Walkey et al. | 138—177 X |

OTHER REFERENCES

"Porous Plastics Film and Sheet," in Modern Plastics, vol. 32, No. 5, pp. 102 and 103, January 1955, Breskin Publications, Bristol, Conn.

LAVERNE D. GEIGER, *Primary Examiner.*

C. HOUCK, *Assistant Examiner.*